(12) United States Patent
Wu

(10) Patent No.: US 8,218,613 B2
(45) Date of Patent: Jul. 10, 2012

(54) CHANNEL ESTIMATOR AND CHANNEL ESTIMATION METHOD

(75) Inventor: Shan Tsung Wu, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 700 days.

(21) Appl. No.: 12/404,834

(22) Filed: Mar. 16, 2009

(65) Prior Publication Data

US 2010/0086018 A1 Apr. 8, 2010

(30) Foreign Application Priority Data

Oct. 2, 2008 (TW) .............................. 97137920 A

(51) Int. Cl.
*H03K 5/159* (2006.01)
(52) U.S. Cl. ......... 375/232; 375/229; 375/231; 375/230
(58) Field of Classification Search .................... 375/232
See application file for complete search history.

(56) References Cited

U.S. PATENT DOCUMENTS

| 6,888,903 | B1 * | 5/2005 | Stenstrom et al. ............ 375/350 |
| 7,428,267 | B2 * | 9/2008 | Lee et al. ...................... 375/260 |
| 2004/0076239 | A1 * | 4/2004 | Yu et al. ........................ 375/260 |
| 2005/0141626 | A1 * | 6/2005 | Lee et al. ...................... 375/260 |
| 2005/0153663 | A1 * | 7/2005 | Pan et al. ......................... 455/78 |
| 2006/0067395 | A1 * | 3/2006 | Hafeez ........................... 375/232 |
| 2007/0258357 | A1 * | 11/2007 | Akita ............................. 370/208 |
| 2009/0225913 | A1 * | 9/2009 | Nakahara et al. ............. 375/347 |
| 2010/0040027 | A1 * | 2/2010 | Camp et al. ................... 370/335 |
| 2010/0040156 | A1 * | 2/2010 | Patel et al. ..................... 375/260 |
| 2010/0098146 | A1 * | 4/2010 | Kim et al. ...................... 375/232 |
| 2010/0166126 | A1 * | 7/2010 | Matsumura et al. .......... 375/350 |
| 2010/0177251 | A1 * | 7/2010 | Kimura et al. ................ 348/726 |
| 2010/0232491 | A1 * | 9/2010 | Hayashi ........................ 375/229 |
| 2011/0173508 | A1 * | 7/2011 | Wehinger ...................... 714/748 |
| 2011/0211630 | A1 * | 9/2011 | Nakahara et al. ............. 375/232 |

* cited by examiner

*Primary Examiner* — Chieh M Fan
*Assistant Examiner* — Santiago Garcia
(74) *Attorney, Agent, or Firm* — WPAT., P.C.; Justin King

(57) ABSTRACT

The invention discloses a double-estimation channel estimator for calculating a plurality of accurate channel responses from a plurality of synchronization signals. The channel estimator includes a first channel estimator, a second channel estimator, a first equalizer, and a calculation module. The first channel estimator calculates first channel responses according to a plurality of pilot signals and the synchronization signals. The first equalizer calculates first equalization signals according to the first channel responses and the synchronization signals. The second channel estimator calculates second responses according to the first equalization signals and the synchronization signals. Then the calculation module calculates third channel responses according to the first channel responses and the second channel responses.

7 Claims, 7 Drawing Sheets

CHANNEL ESTIMATOR AND CHANNEL ESTIMATION METHOD

CROSS REFERENCE TO RELATED PATENT APPLICATION

This patent application is based on a Taiwan, R.O.C. patent application No. 097137920 filed on Oct. 2, 2008.

FIELD OF THE INVENTION

The present invention relates to a channel estimator and a channel estimation method. More particularly, the present invention relates to a channel estimator and a channel estimation method for an orthogonal frequency division multiplexing (OFDM) system.

BACKGROUND OF THE INVENTION

In the recent years, accompanied with the fast-developing technology from computerization, networking to the current digitization, operation modes of various industries are inevitably changed as well. Among the changes, digitalization of the media industry is considered as one of the most important and revolutionary tasks that entrepreneurs look into. The associated digital television (DTV), being a center of attention in terms of consumer electronics, is not only a focus in the development of information appliances but also a critical gateway for the Internet to enter the living room of households.

A common DTV adopts Digital Video Broadcasting (DVB) signals of the DVB standards for transmissions of various television signals. The core structure of DVB is an orthogonal frequency division multiplexing (OFDM) modulation system that performs wireless signal transmissions.

In an OFDM system, data is modulated into signals at a transmitting end, and is then transmitted over channels by such as quadrature phase-shift keying (QPSK), quadrature amplitude modulation (QAM) and phase-shift keying (PSK). The OFDM system is capable of supporting large-amount data transmissions, and has greater usage flexibility in bandwidth. However, the OFDM system is not entirely flawless; for example, when applied in wireless transmissions, the OFDM system is resulted with timing offset, phase offset and frequency offset. These issues have great impacts on received signals at the receiving end, and the undesirable effects substantially reduce performance of the OFDM system. In a real environment, channels of the OFDM system are changed along with the environment and time. When transmitted to the receiving end via wireless channel transmission, received signals at the receiving end may be different from the ones transmitted from the transmitting end for that the signals are prone to distortion due to changes or interferences of the channels. At the receiving end, in order to recover the received signals from distortion, the effects of the channels need be first estimated to accurately; that is, channel estimation need first be performed accurately recover the signals transmitted from the transmitting end. Common channel estimation is implemented using pilot signals. More specifically, a plurality of pilot signals are placed in sub-channels of specific frequencies at the transmitting end, and the known pilot signals are then used at the receiving end to calculate channel responses of the sub-channels of the specific frequencies.

FIG. 1A shows a block diagram of a common receiving end comprising a synchronizer 11, a channel estimator 13, an equalizer 15 and a decoder 17. The synchronizer 11 receives a wireless signal 10, and generates a synchronization signal 12. The synchronization signal 12 is compliant to, for example, Digital Video Broadcasting-Terrestrial (DVB-T), Digital Video Broadcasting-Satellite (DVB-S), Digital Video Broadcasting-Cable (DVB-C) standards specified by the DVB standards, digital television standards specified by the Advanced Television System Committee (ATSC), or associated digital television standards specified by other standard organizations.

The channel estimator 13 receives the synchronization signal 12, and performs calculations and estimations for pilot channel responses in the synchronization signals 12 according to known pilot signals 14. The equalizer 15 receives channel responses 16 estimated by the channel estimator 13, and processes the synchronization signals 12 according to the channel responses 16 to generate equalization signals 18, which is regarded signals transmitted by the transmitting end. The decoder 17 then receives and processes the equalization signals 18 to generate digital television signals to be played.

It is apparent from the above description that, the synchronization signals 12 transmitted by the transmitting end may be accurately recovered, provided that the channel responses needed during the recovery are obtained according to the channel responses of the pilot signals.

FIG. 1B shows a relationship diagram between frequency and time of DVB signals having pilot signals; note that only partial sub-channels and time points are shown. In FIG. 1B, the horizontal axis f represents sub-channels of different frequencies, and the vertical axis t represents different time points. The channel response in a frequency f sub-channel at a time point t is represented as H (frequency f, t time), and the receiving time is from the negative to the positive. For example, a signal received at a time point t=−1 is before a signal received at a time point t=1, and a signal received at a time point t=4. Pilot signals are transmitted over specific frequency sub-channels with DVB signals transmission, and are categorized into at least continuous pilot (CP) signals and scatter pilot (SP) signals. The continuous pilot signals are placed at all time points over a specific frequency sub-channel (or referred to as a continuous pilot sub-channel). For example, pilot signals are placed at all time points at coordinate axes f=−3 and f=27. The scatter pilot signals are placed intermediately over a specific frequency sub-channel (or referred to as a scatter pilot sub-channel). For example, at the coordinate axis f=0, pilot signals are placed at time points t=−4, 0, 4, and so on. That is, pilot signals are placed at coordinates (0, −4), (0, 0), (0, 4), and so on. For another example, at f=3, pilot signals are placed at time points t=−5, −1, 3, and so on; that is, the coordinates (3, −5), (3,−1), (3, 3), and so on. The transmitting end transmits and the receiving end receives the continuous pilot signals and the scatter pilot signals in compliance with DVB standards. Therefore, the receiving end determines distortion of the DVB signals transmitted through the channels according to the continuous pilot signals and the scatter pilot signals, so as to increase accuracy in recovering the signals. Further, channel frequency responses of the DVB signals at time points without pilot signals over the scatter pilot sub-channels are calculated and estimated. Up to this point, all sub-channel responses of the OFDM communication system are obtained. However, most of the channel responses are obtained on basis of estimation that inevitably contains certain degrees of errors. Particularly, under circumstances that the receiving end is moving at a high speed, and more severe inaccuracies in channel estimations are incurred and result in erroneous signal recovery.

Therefore, the invention provides a new channel estimator and a channel estimation method to estimate more accurate channel responses for overcoming the foregoing issues.

SUMMARY OF THE INVENTION

It is one objective of the invention to provide a double-estimation estimator. The double-estimation channel estimator for calculating a plurality of accurate channel responses from a plurality of synchronization signals, comprising a first channel estimator, for calculating a plurality of first channel responses at all time points over all sub-channels according to a plurality of pilot signals and the synchronization signals; a first equalizer, for calculating a plurality of first equalization signals at all the time points over all the sub-channels according to the first channel responses and the synchronization signals; a second channel estimator, for calculating a plurality of second responses at all the time points over all the sub-channels according to the first equalization signals and the synchronization signals; and a calculation module, for calculating a plurality of third channel responses at all the time points over all the sub-channels according to the first channel responses and the second channel responses, wherein the third responses are the accurate channel responses.

It is another objective of the invention to provide a channel estimation method using double estimation. The double-estimation channel estimating method for calculating a plurality of accurate channel responses from a plurality of synchronization signals, comprising steps of calculating a plurality of first channel responses at all time points over all sub-channels according to the synchronization signals and a plurality of pilot signals; calculating a plurality of first equalization signals at all the time points over all the sub-channels according to the synchronization signals and the first channel responses; calculating a plurality of second channel responses at all the time points over all the sub-channels according to the synchronization signals and the first equalization signals; and calculating a plurality of third channel responses at all the time points over all the sub-channels according to the first channel responses and the second channel responses, wherein the third responses are the accurate channel responses.

By accomplishing the above objectives of the invention, the invention further performs channel estimation on the sub-channels of the DVB signals after finishing the first channel estimation of the DVB signals, so as to lower channel estimation errors and to improve channel estimation quality.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1A:
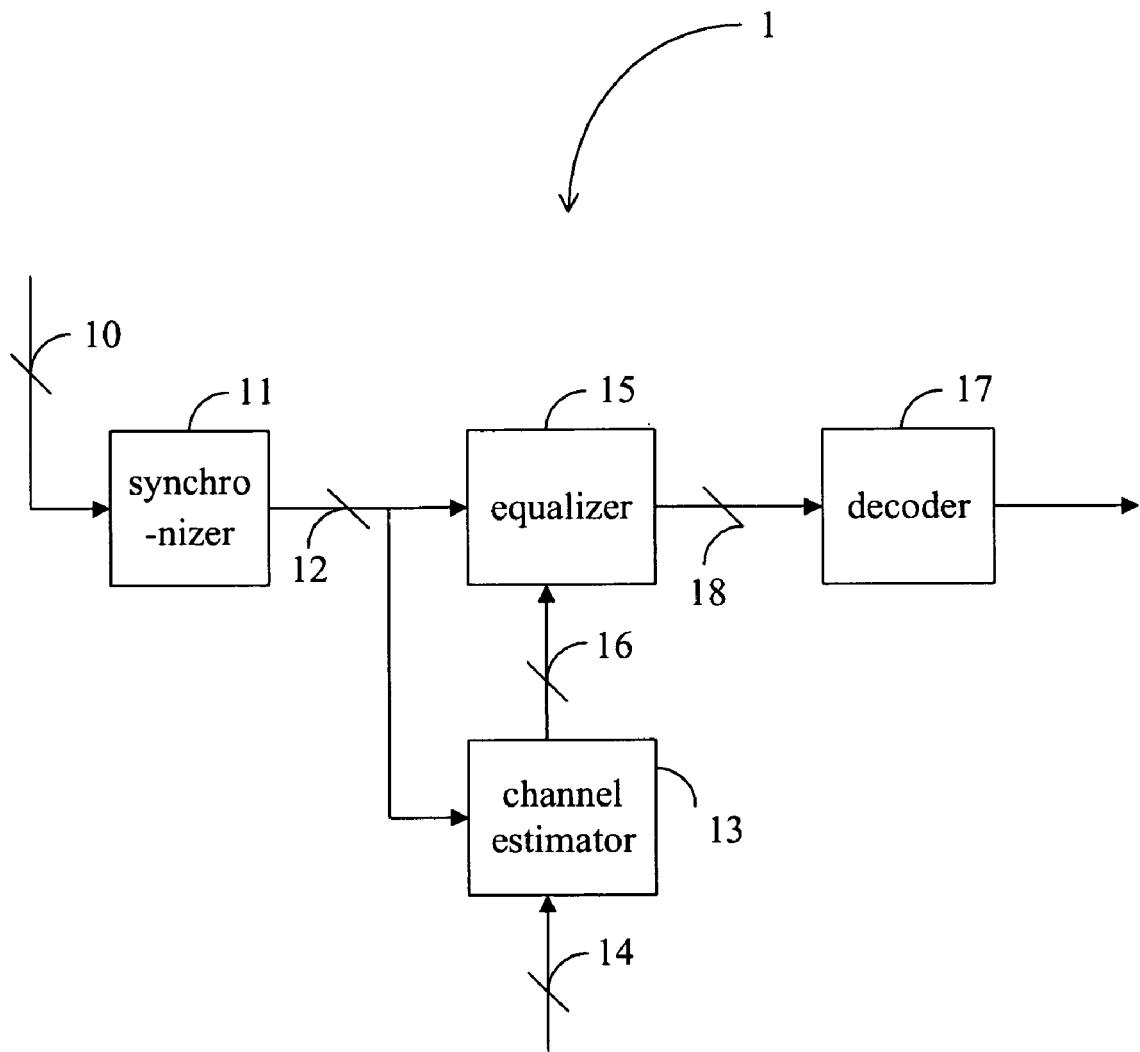
FIG. 1A is a block diagram of a conventional receiver.
Figure 1B:
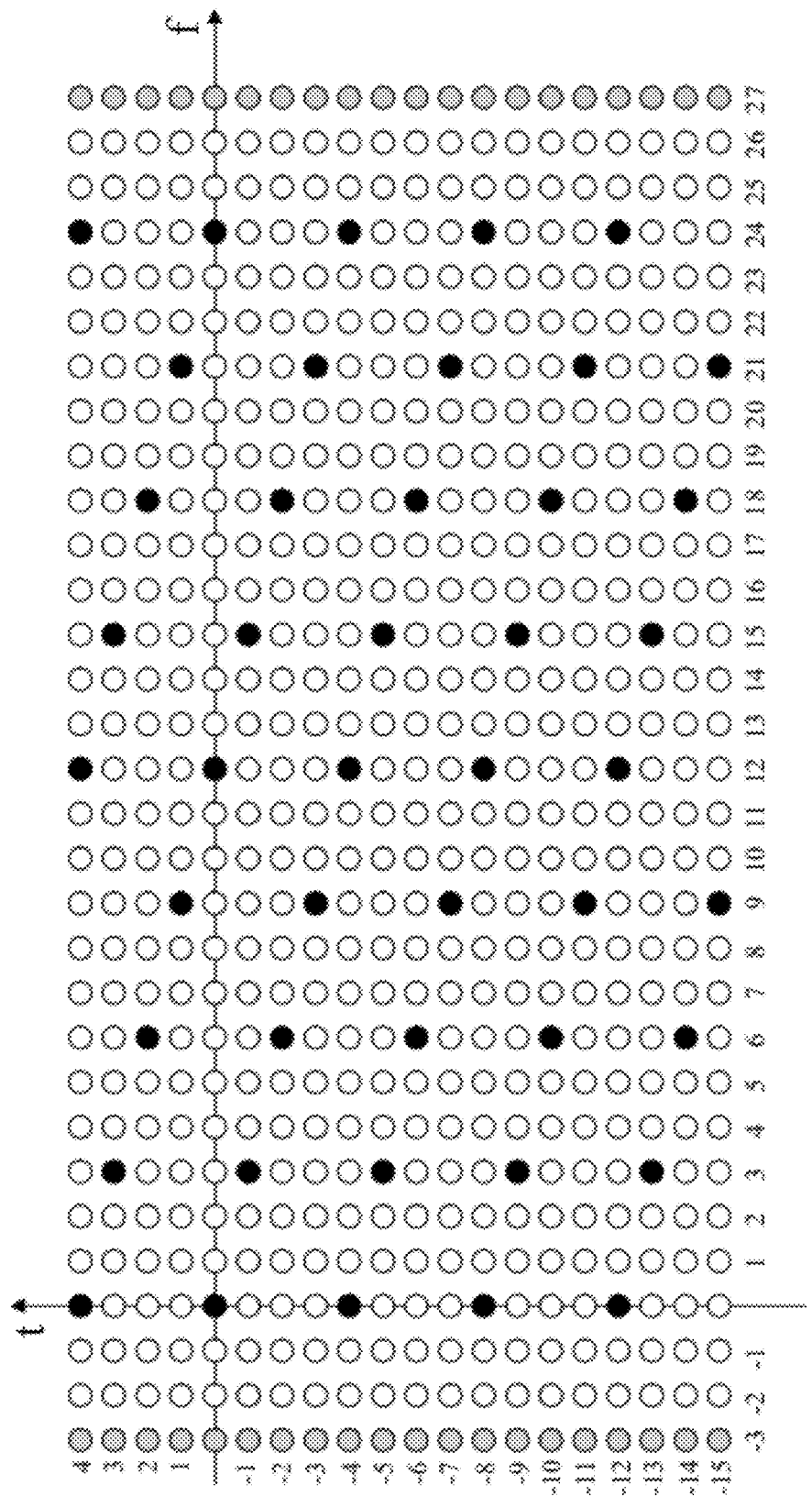
FIG. 1B is the relationship diagram of channel responses at various frequency sub-channels and time
Figure 2:
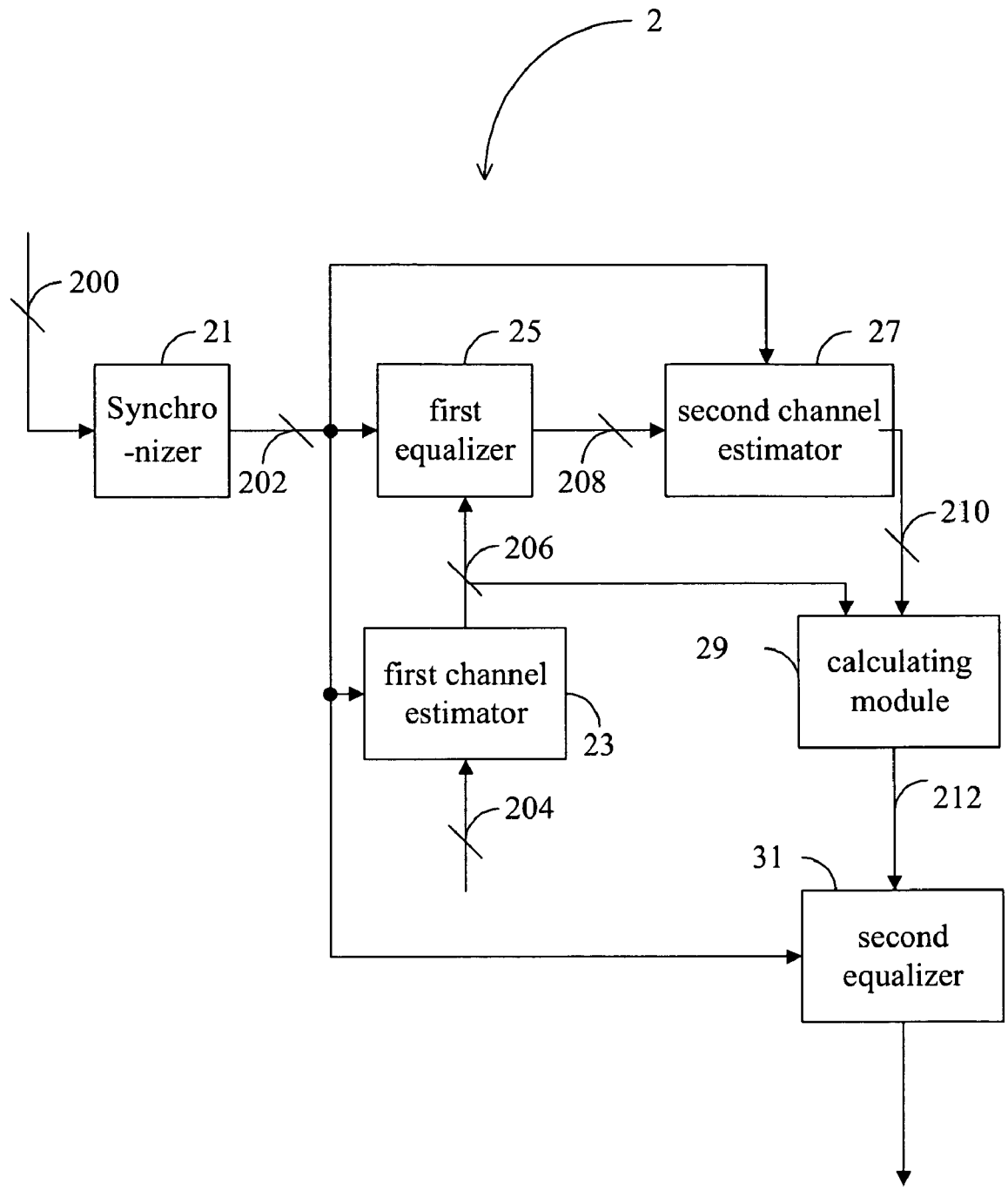
FIG. 2 is a block diagram of a receiver according to the invention.

FIG. 2 shows a block diagram showing an OFDM signal receiver 2 of the invention. The receiver 2 comprises a synchronizer 21, a first channel estimator 23, a first equalizer 25, a second channel estimator 27, a calculation module 29 and a second equalizer 31. The invention adopts a double channel response estimation procedure for obtaining more accurate channel responses. The synchronizer 2 receives wireless signals 200, and processes the same to generate synchronization signals 202. The synchronization signals 202 may be digital television signals compliant to standards specified by, for example, Digital Video Broadcasting-Terrestrial (DVB-T), Digital Video Broadcasting-Satellite (DVB-S), Digital Video Broadcasting-Cable (DVB-C) standards, the Advanced Television System Committee (ATSC), or other standard organizations.

The first channel estimator 23 receives the synchronization signals 202, calculates and estimates channel responses of the synchronization signals 202 over various pilot sub-channels according to known pilot signals 204. The known pilot signals including continuous pilots and scatter pilots defined in each standard are known by the transmitter and the receiver and are used for estimating the channel response by the receiver. Then, the first channel estimator 23 calculates channel responses over other sub-channels without pilot signals. The first equalizer 25 receives first channel responses 206 in all the sub-channels estimated by the first channel estimator 23, and processes the synchronization signals 202 using the same. The second channel estimator 27 performs signal processing according to the first equalizer 25, which preliminarily removes distortions resulted from the channels to generate the first equalization signals 208. The first equalization signals 208 are used for re-estimating channel responses at all the time points over all the sub-channels to generate second channel responses 210. The calculation module 29 calculates according to the first channel responses 206 and the second channel responses 210 to generate third channel responses 212. The first channel responses 206, the first equalization signals 208, the second channel responses 210, and the third channel responses 212 are stored temporally in a storage module (not shown in figure,) for example DRAM. The second equalizer 31 recovers the synchronization signal 202 according to the third channel responses, and outputs the same to a decoder to recover the digital video broadcast signals to be transmitted at the transmitting end.

Figure 3:
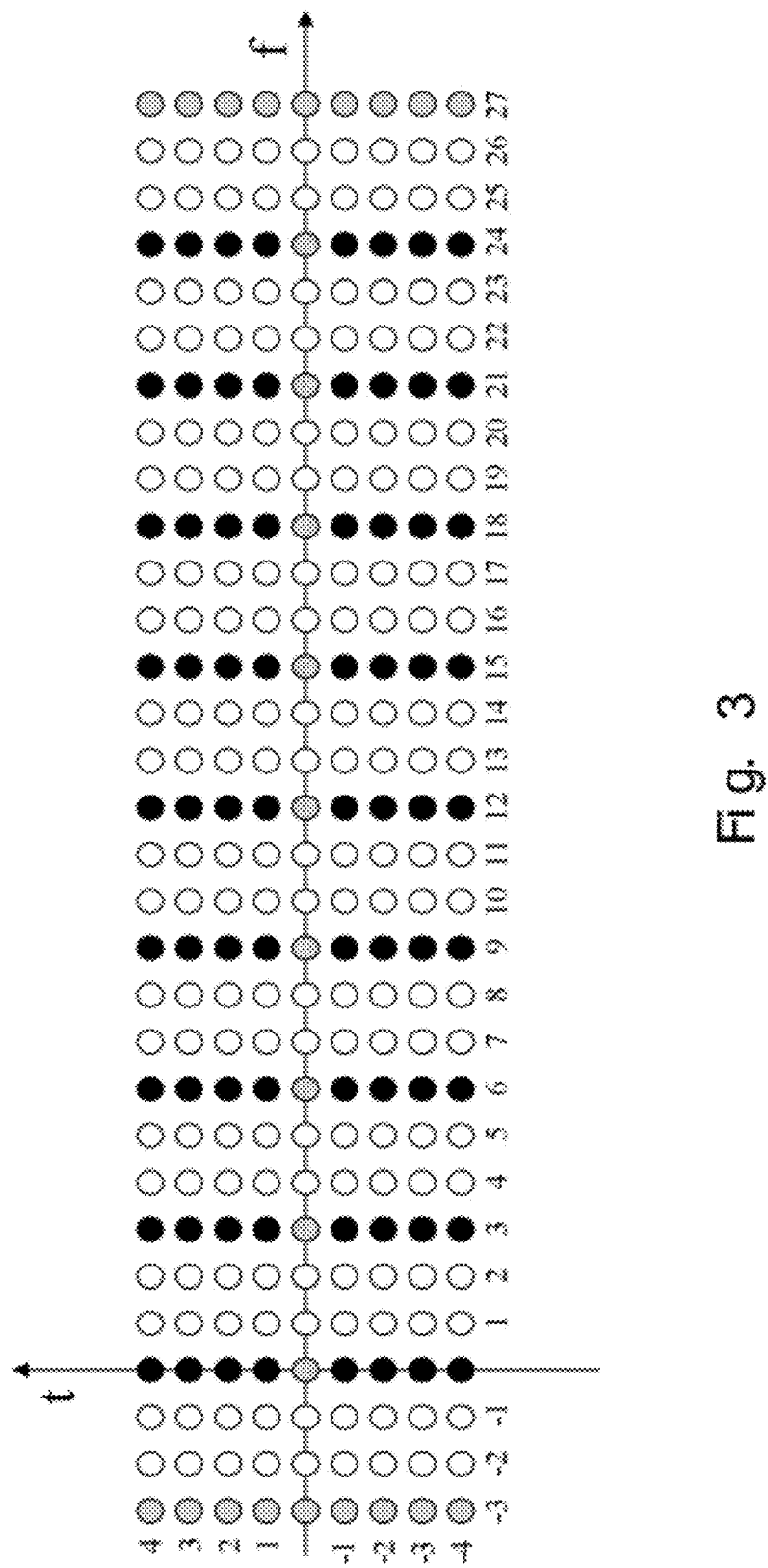
FIG. 3 is the relationship diagram of channel responses at various frequency sub-channels and time according to the invention.

FIG. 3 shows a partial relationship diagram between channel responses of the sub-channels and time. Wherein, the axis f represents sub-channels of different frequencies, the vertical axis t represents different time points, and H (frequency f, time t) represents a channel response at a specific time point t over a specific f sub-channel. The sub-channels may be continuous pilot sub-channels, such as sub-channels at coordinate axes f=−3 and f=27; scatter pilot sub-channels, such as sub-channels at coordinate axes f=0, f=3 and f=6; and sub-channels without pilot signals, such as coordinate axes f=1, f=2 and f=4.

Figure 4:
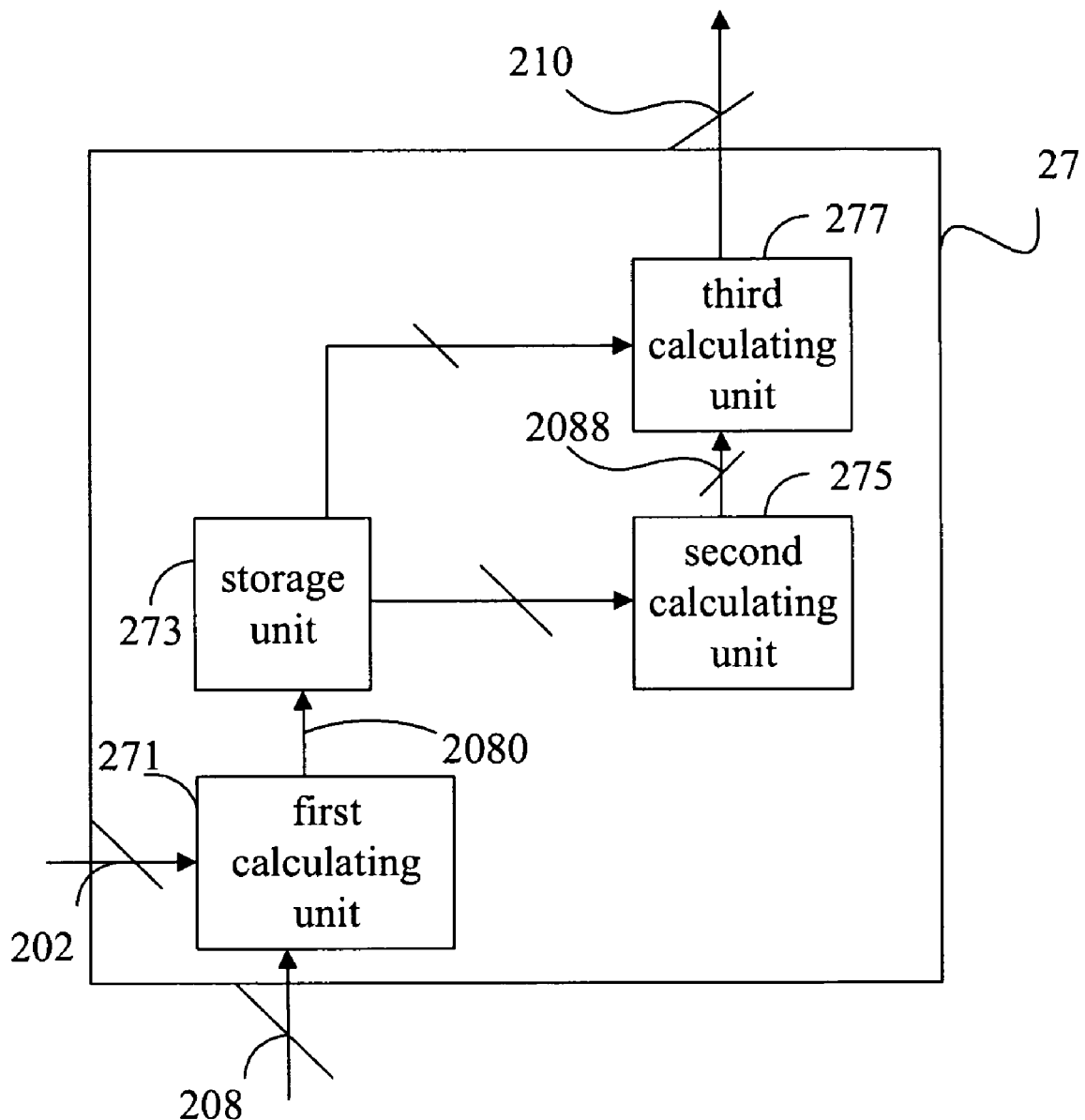
FIG. 4 is a block diagram of a second channel estimator according to the invention.

FIG. 4 shows a detailed block diagram of the second channel estimator 27 comprising a first calculating unit 271, a storage unit 273, a second calculating unit 275 and a third calculating unit 277. The first calculating unit 271 receives the synchronization signal 202 from the synchronizer 21 and the first equalization signals 208 from the first equalizer 25 to calculate fourth channel responses 2080 to be stored into the storage unit 273. The storage unit 273 could be a portion of the storage module in above mention. The second calculating unit 275 calculates a plurality of parameters 2088 according to a plurality of channel responses of the continuous pilot signals over continuous pilot sub-channels among the fourth channel responses. The third calculating unit 277 calculates the second channel responses 210 obtained by calculating corresponding fourth channel responses 2080 and corresponding parameters. Calculations for the second channel responses shall be further described with reference to FIG. 3 showing the relationship diagram between channel responses of the sub-channels and time. Taking the channel response H"(8,0) of the frequency f=8 sub-channel and the time point t=0 for example, the third calculating unit 277 determines the second channel responses H"(8,0) 210 according to the equation below:

$$H''(8,0)=c(8,2)\hat{H}(8,2)+c(8,1)\hat{H}(8,1)+c(8,-1)\hat{H}(8,-1)+c(8,-2)\hat{H}(8,-2)$$

Wherein, $\hat{H}(8,2)$, $\hat{H}(8,1)$, $\hat{H}(8,-1)$, $\hat{H}(8,-2)$ are the fourth channel responses, which are obtained according to the synchronization signals 202 from the synchronizer 21, the first equalization signals 208 from the first equalizer 25, and the equation below:

$$\hat{H}(f,t) = \frac{y(f,t)}{x(f,t)}$$

Wherein, $\hat{H}(f,t)$ is the fourth channel response 2080 at the time point t over the frequency f sub-channel, y(f, t) is the synchronization signal 202 at the time point t over the frequency f sub-channel, and x(f, t) is the first equalization signal 208 at the time point t over the frequency f sub-channel.

The parameters c(8,2), c(8,1), c(8,-1) and c(8,-2) respectively correspond to $\hat{H}(8,2), \hat{H}(8,1), \hat{H}(8,-1), \hat{H}(8,-2)$, and are obtained by the second calculating unit 275 according to the equation below:

$$h = \hat{H}C$$

wherein, $$c = \begin{bmatrix} c(8,2) \\ c(8,1) \\ c(8,-1) \\ c(8,-2) \end{bmatrix}$$

$$h = \begin{bmatrix} \hat{H}(CP_1, 0) \\ \hat{H}(CP_2, 0) \\ \vdots \\ \hat{H}(CP_n, 0) \end{bmatrix}$$

$$\hat{H} = \begin{bmatrix} \hat{H}(CP_1, 2) & \hat{H}(CP_1, 1) & \hat{H}(CP_1, -1) & \hat{H}(CP_1, -2) \\ \hat{H}(CP_2, 2) & \hat{H}(CP_2, 1) & \hat{H}(CP_2, -1) & \hat{H}(CP_2, -2) \\ \vdots & & & \\ \hat{H}(CP_n, 2) & \hat{H}(CP_n, 1) & \hat{H}(CP_n, -1) & \hat{H}(CP_n, -2) \end{bmatrix}$$

Wherein, frequencies f=CP1 to f=CPn are continuous pilot sub-channels of n different frequencies; $\hat{H}(CP_1,0)$ to $\hat{H}(CP_n,0)$ are channel responses of n continuous sub-channels at the time point t=0 (i.e., the time point of the channel response H"(8,0) to be estimated; $\hat{H}(CP_1,2)$ to $\hat{H}(CP_n,2)$ are channel responses of n continuous sub-channels at the time point t=2; and meanings of the remaining $\hat{H}(CP_1,1)$ to $\hat{H}(CP_n,1)$, $\hat{H}(CP_1,-1)$ to $\hat{H}(CP_n,-1)$, and $\hat{H}(CP_1,-2)$ to $\hat{H}(CP_n,-2)$, are derived similarly.

The second calculating unit 275 of the second channel estimator 27 according to the invention determines the foregoing parameters using a least-square method (LSM) using the equation below:

$$C=C_{LS}=(\hat{H}^*\hat{H})^{-1}*h$$

wherein, * is the conjugate transpose, and −1 is the inverse.

Using the above equation, the parameters c(8,2), c(8,1) c(8,−1) and c(8,−2) maybe obtained.

The calculation module 29 then determines the third channel response H'"(8,0) according to the equation below:

$$H'''(8,0)=\alpha H'(8,0)+(1-\alpha)H''(8,0)$$

wherein, H'(8,0) represents the first channel response 206, H"(8,0) represents the second channel response 210, and α is a weight factor which usually be determined as a fixed value between 0 to 1.

In the calculations of the above preferred embodiment, the second channel response H"(8,0) is calculated by the third calculating unit 277 according to the four fourth channel responses 2080 (i.e., $\hat{H}(8,2), \hat{H}(8,1), \hat{H}(8,-1), \hat{H}(8,-2)$) that are symmetrical to the time point to be estimated, as well as the four corresponding parameters c(8,2), c(8,1), c(8,−1) and c(8,−2). However, the second channel response H"(8,0) is not limited to being generated by a specific number of fourth channel responses $\hat{H}(f,t)$ but may be by any number of plurality of fourth channel responses; the fourth channel responses used are not limited to channel responses that are symmetrical to the time point to be estimated; the number of fourth channel responses before the time point to be estimated may be more than the number of the fourth channel responses after the time point to be estimated. Thus, system memory space is reduced while leaving performance of channel estimated unaffected. Further, the plurality of parameters c(f, t) corresponding to the fourth channel responses, generated by other fourth channel responses, are not limited to being generated by responses of continuous sub-channels but may be by other channel responses of sub-channels to be estimated.

Using the above equations, the sub-channel response (i.e., the third channel response 212) at the coordinate (8,0) can be easily updated, and has a higher accuracy compared to that obtained by the first channel estimator alone.

Figure 5:
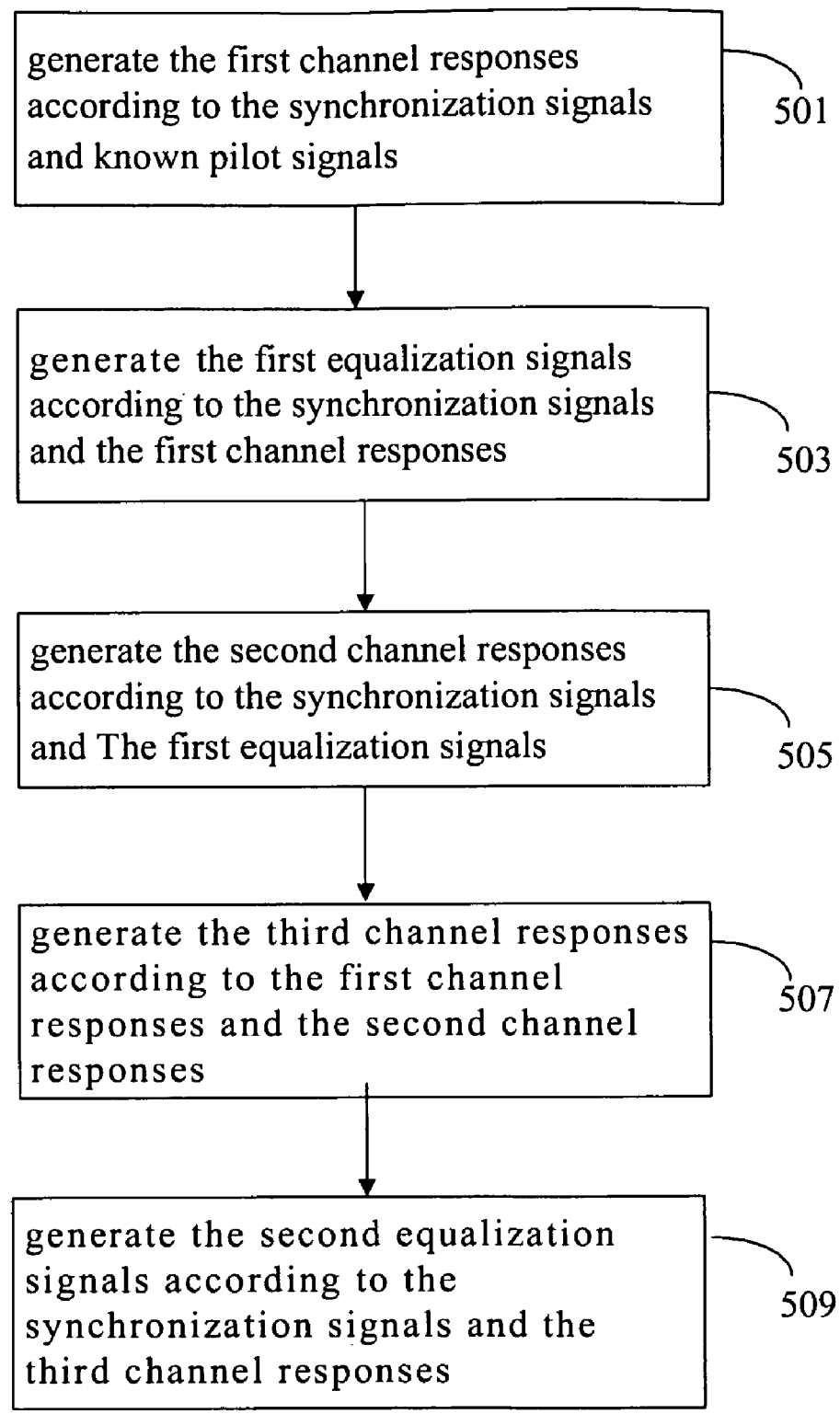
FIG. 5 is a flowchart of a channel estimation method according to the invention.
Figure 6:
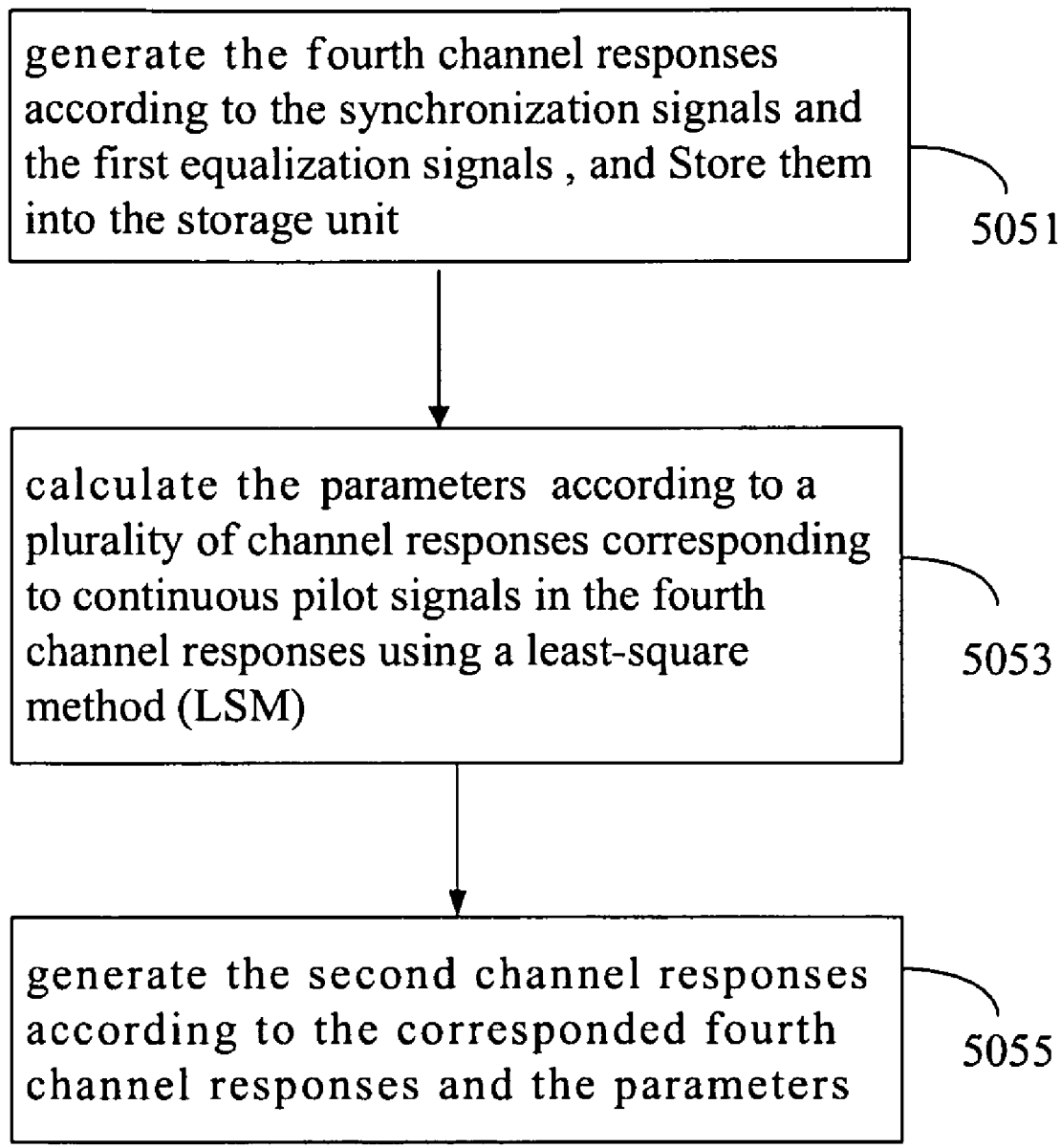
FIG. 6 is a flowchart of a second channel estimation according to the invention.

The invention also provides a channel estimation method for the channel estimator using double estimation shown in FIG. 5 shows a flowchart of the channel estimation method.

The method begins with Step 501 to generate the first channel responses 206 according to the synchronization signals 202 and known pilot signals 204. In Step 503, the first equalization signals 208 are generated according to the synchronization signals 202 and the first channel responses 206. In Step 505, the second channel responses 210 are generated according to the synchronization signals 202 and the first equalization signals 208. In Step 507, the third channel responses 212 are generated according to the second channel responses 210 and the first channel responses 206. In the last Step 509, the second equalization signals 214 are generated according to the synchronization signals 202 and the third channel responses 212.

Step 505 of generating the second channel responses 210 according to the synchronization signals 202 and the first equalization signals 208 is realized using the second channel estimator 27 controlled by an application program. Referring to FIG. 5, Step 505 comprises steps below. In Step 5051, fourth channel responses are generated according to the synchronization signals 202 and the first equalization signals 208, and are stored into the storage unit 273. In Step 5053, a plurality of parameters 2088 are calculated according to a plurality of channel responses corresponding to continuous pilot signals in the fourth channel responses 2080 using a least-square method (LSM). In Step 5055, the second channel responses 210 are generated according to the parameters 2088 and the corresponding channel responses in the fourth channel responses.

In Step 507, the third channel responses 212 are generated according to the second channel responses 210 and the first channel responses 206 having weight factors of $\alpha$ and $(1-\alpha)$, respectively.

Apart from the steps above, the channel estimation method according to the invention is also capable of performing operations and functions of the second channel estimator 27. However, the operations and functions of the second channel estimator are easily appreciated by a person having ordinary skill in the art, and descriptions of such are omitted for brevity.

According to the foregoing descriptions, the double channel estimator according to the invention is capable of reinforcing channel estimation accuracy of DVB signals in order to satisfy accuracy requirements on channel response of the OFDM system, especially under circumstances that the receiving end is moving at a high speed.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A double-estimation channel estimator for calculating a plurality of accurate channel responses from a plurality of synchronization signals, comprising:
    a first channel estimator, for calculating a plurality of first channel responses at all time points over all sub-channels according to a plurality of pilot signals and the synchronization signals;
    a first equalizer, for calculating a plurality of first equalization signals at all the time points over all the sub-channels according to the first channel responses and the synchronization signals;
    a second channel estimator, for calculating a plurality of second responses at all the time points over all the sub-channels according to the first equalization signals and the synchronization signals; and
    a calculation module, for calculating a plurality of third channel responses at all the time points over all the sub-channels according to the first channel responses and the second channel responses, wherein the third responses are accurate channel responses;
    wherein the second channel estimator comprises:
    a first calculating unit, for calculating a plurality of fourth channel responses at all the time points in all the sub-channels according to the first equalization signals and the synchronization signals;
    a second calculating unit, for calculating a plurality of parameters at a specific time point over a specific sub-channel to be estimated according a first part of the fourth channel responses corresponding to the specific time point; and
    a third calculating unit, for calculating the second channel response at the specific time point over the specific sub-channel to be estimated according to a second part of the fourth channel responses corresponding to the specific time point and the parameters.

2. The double-estimation channel estimator as claimed in claim 1, further comprising:
    a storage module, for storing the first channel responses, the first equalization signals and the second channel responses, and
    a second equalizer, for calculating a plurality of second equalization signals at all the time points over all the sub-channels according to the accurate channel responses and the synchronization signals.

3. The double-estimation channel estimator as claimed in claim 1, wherein the parameters are calculated according to a plurality of fourth channel responses with continuous pilot signals.

4. A double-estimation channel estimating method for calculating a plurality of accurate channel responses from a plurality of synchronization signals, comprising steps of:
    calculating a plurality of first channel responses at all time points over all sub-channels according to the synchronization signals and a plurality of pilot signals;
    calculating a plurality of first equalization signals at all the time points over all the sub-channels according to the synchronization signals and the first channel responses;
    calculating a plurality of second channel responses at all the time points over all the sub-channels according to the synchronization signals and the first equalization signals; and
    calculating a plurality of third channel responses at all the time points over all the sub-channels according to the first channel responses and the second channel responses, wherein the third responses are the accurate channel responses;
    wherein the step of calculating the second channel responses at all the time points over all the sub-channels further comprises steps of:
    calculating a plurality of fourth channel responses at all the time points over all the sub-channels according to the synchronization signals and the first equalization signals;
    calculating a plurality of parameters at a specific time point over a specific sub-channel to be estimated according to a first part of the fourth channel responses corresponding to the specific time point; and
    calculating the second channel response at the specific time point over the specific sub-channel to be estimated according to a second part of the fourth channel responses corresponding to the specific time point and the parameters.

5. The double-estimation channel estimating method as claimed in claim 4, further comprising a step of:
    storing the first channel responses, the first equalization signals and the second channel responses.

6. The double-estimation channel estimating method as claimed in claim 4, wherein the parameters are calculated according to a plurality of fourth channel responses with continuous pilot signals.

7. The double-estimation channel estimating method as claimed in claim 4, wherein the second part of the fourth channel responses do not include the channel response at the specific time point in the first part of the fourth channel responses.

* * * * *